Nov. 13, 1923.
H. VANDERHOOF ET AL
1,474,215
DEMOUNTABLE BRAKE LINING
Filed Feb. 5, 1923
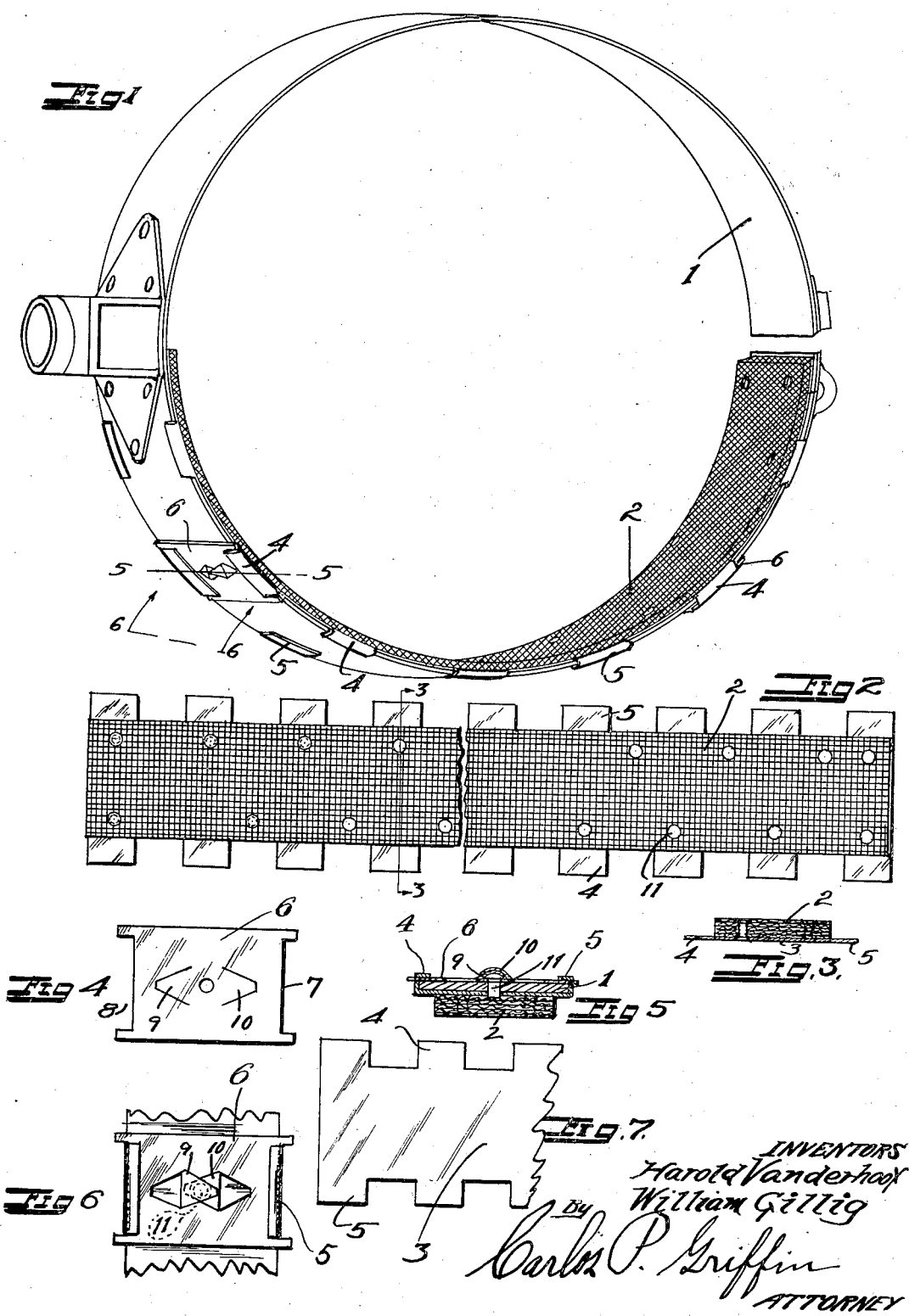

Patented Nov. 13, 1923.

1,474,215

UNITED STATES PATENT OFFICE.

HAROLD VANDERHOOF AND WILLIAM GILLIG, OF SAN FRANCISCO, CALIFORNIA.

DEMOUNTABLE BRAKE LINING.

Application filed February 5, 1923. Serial No. 617,076.

*To all whom it may concern:*

Be it known that we, HAROLD VANDERHOOF and WILLIAM GILLIG, citizens of the United States, residing at San Francisco, in the county of San Francisco, State of California, have invented a new and useful Demountable Brake Lining, of which the following is a specification, in such full and clear terms as will enable those skilled in the art to construct and use the same.

This invention relates to a demountable brake lining, and its object is to provide means whereby a worn-out lining may be quickly taken out and a new one put in without dismounting the brake band.

The present invention is an improvement on our demountable brake lining patent application filed November 20th, 1922, Serial Number 602,222, and an object of the invention is to reduce the cost of construction and make the lining more easy to apply.

Another object of the invention is to provide means for holding the brake lining securely against movement in its length, without cutting notches in the brake band and thereby saving time and expense in attaching the lining in the first instance.

Other objects of the invention will appear as the description proceeds.

An embodiment of the invention is shown in the accompanying drawings, in which the same reference numeral is applied to the same portion throughout, but we are aware that there may be modifications thereof.

Fig. 1 is a perspective view of a brake band with a half brake lining attached.

Fig. 2 is a plan view of a strip of brake lining riveted to a metal strip with ears for connecting it to the brake band, Fig. 3 is a section taken on line 3—3 of Fig. 2, Fig. 4 is a plan of a metal clip for holding the brake lining against longitudinal movement, Fig. 5 is a section on line 5—5 of Fig. 1, Fig. 6 is a plan view looking in the direction of the arrows 6—6, and Fig. 7 is plan of a portion of the metal strip to which the brake lining is riveted.

The numeral 1 indicates a steel brake band as ordinarily used on automobiles.

The brake lining 2 is first riveted to a metal strip 3 which has ears 4 and 5 adapted to be bent over the edges of the brake band.

The brake lining may be mounted in two parts, one part of which is shown attached to the brake band in Fig. 1 or in one complete lining.

To prevent longitudinal creeping or slipping of the brake lining, a metal clip 6, is provided, which is adapted to be placed outside the brake band and has notches 7 and 8 into which the ears 4 and 5 are bent to hold the clip in place. The clip has the cut portions which can be bent up to form tabs 9 and 10.

After the clip is in place a hole is drilled through the clip, the brake band and the metal strip and a rivet 11 is placed in, whereupon the tabs are bent over the rivet to hold it from dropping out.

Any number of these clips may be used but for each half brake lining two are here shown.

In actual practice the band 3 is made of a soft metal and is sold attached to the brake band material. When it is to be used the old brake band is removed from the spring band 1 and the new brake lining is inserted in place, the tabs 4 and 5 being bent over the spring brake band 1. Two or more holes are also bored in the spring brake band to receive the rivets 11 to prevent creeping and several of the tabs are bent into and over the clips 6 when a brake band is to have this material applied thereto. After it has been once applied thereto, it is removed by simply prying up the ears 4 and 5 with a screw driver or chisel and pulling the lining out of place without removing the band from the car, whereupon a new lining can be slipped into place and the clips bent over the spring band 1.

What we claim is as follows, but modifications may be made in carrying out the invention shown in the drawings and in the above particularly described form thereof within the purview of the invention.

1. A vehicle brake band comprising a metallic band, a heat resistant material attached to said band, spaced ears projecting from the edges of said band, and adapted to be bent over the edges of brake band, clips on the outside of said brake band, notches in said clips to receive said ears when bent over the edges of said brake band, a hole extending through said clip, said brake band and said metallic band, a loose rivet in said hole, tabs on said clip adapted to be bent over said rivet to hold it in place.

2. A vehicle brake lining band in combination with a brake band, a metallic band, ears projecting from the edges of said metallic band, a heat resistant friction material attached to said metallic band, a clip adapted to be held on the outside of said brake band by a pair of said ears bent over the edges of said brake band, notches in said clip adapted to receive said ears, a hole extending through said clip, said brake band, and said metallic band, a pin in said hole, tabs in said clip adapted to be bent over said pin to hold it in place.

3. A vehicle brake lining band of the class described, comprising in combination a brake band, a detachable metal strip with ears projecting from the edges thereof, a brake lining fixed to said metal strip, a clip on the outside surface of said brake band adapted to be held in place by the said ears when bent over, a hole extending through said clip, said brake band, and said metal strip, a pin in said hole and tabs on said clip adapted to be bent over said pin to hold it in place.

4. The combination with a vehicle brake band of a lining therefor, comprising a metal strip having projecting ears on its sides, a friction material secured to said metal strip and clips on the outside of the brake band, the ears of said metal strip being bent over the brake band and over said clips to secure it thereto.

5. The combination with a vehicle brake band of a lining therefor, comprising a metal strip having a plurality of ears projecting from opposite edges thereof, a friction material secured to said metal strip, clips on the outside of the brake band, means to prevent said clips from moving longitudinally with respect to the brake band, the ears on the metal strip being bent outwardly over the edges of the brake band and over the edges of the clips to hold the brake lining in place.

In testimony whereof we have hereunto set our hands this 26th day of January, A. D. 1923.

HAROLD VANDERHOOF.
WILLIAM GILLIG.